United States Patent
Bender et al.

(10) Patent No.: US 11,356,393 B2
(45) Date of Patent: Jun. 7, 2022

(54) SHARING PERSONALIZED DATA IN AN ELECTRONIC ONLINE GROUP USER SESSION

(71) Applicant: International Business Machines Corporation, Armonk, NY (US)

(72) Inventors: Michael Bender, Rye Brook, NY (US); John F. Kelley, Polk City, FL (US); Jill Dhillon, Laguna Beach, CA (US); Steven Edward Atkin, Austin, TX (US); Stan Kevin Daley, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/035,760

(22) Filed: Sep. 29, 2020

(65) Prior Publication Data

US 2022/0103492 A1    Mar. 31, 2022

(51) Int. Cl.
*H04L 12/58*     (2006.01)
*G06K 9/00*     (2006.01)
(Continued)

(52) U.S. Cl.
CPC ........ *H04L 51/046* (2013.01); *G06F 16/9035* (2019.01); *G06V 40/20* (2022.01);
(Continued)

(58) Field of Classification Search
CPC ... H04L 51/32; H04L 51/046; H04L 12/1831; G06F 16/9035; G16Y 20/40; G06K 9/00335
(Continued)

(56) References Cited

U.S. PATENT DOCUMENTS 6,735,568 B1     5/2004   Buckwalter
7,603,413 B1 *  10/2009   Herold ................... G06Q 10/10
                                                                                709/204
(Continued)

FOREIGN PATENT DOCUMENTS

CN          1237505 C       1/2006
CN        112684881 A       4/2021
(Continued)

OTHER PUBLICATIONS

Mell et al., "The NIST Definition of Cloud Computing", National Institute of Standards and Technology, Special Publication 800-145, Sep. 2011, 7 pages.
(Continued)

*Primary Examiner* — James E Springer
(74) *Attorney, Agent, or Firm* — Michael A. Petrocelli

(57) ABSTRACT

Assessing, using a computer, a state of a participant and sharing personalized data for the participant in an electronic group meeting or collaboration using a communications network. Personalized data is received at a computer for a user participating in electronic group communications including group collaboration. The personalized data received at the computer includes biometric data and personality profile results. The biometric data includes biometric changes in real-time. A biometric change in the user is detected from a baseline for the user. In response to the biometric change, the biometric data is analyzed and the personality profile results to determine a suggested action regarding the user. The suggested action is communicated to the user or another participant user of the group meeting based on the analysis.

30 Claims, 9 Drawing Sheets

(51) Int. Cl.
  *G06F 16/9035* (2019.01)
  *G16Y 20/40* (2020.01)
  *H04L 12/18* (2006.01)
  *H04L 51/046* (2022.01)
  *H04L 51/52* (2022.01)
  *G06V 40/20* (2022.01)

(52) U.S. Cl.
  CPC .......... *G16Y 20/40* (2020.01); *H04L 12/1831* (2013.01); *H04L 51/32* (2013.01)

(58) Field of Classification Search
  USPC .......................................................... 709/206
  See application file for complete search history.

(56) References Cited

U.S. PATENT DOCUMENTS

| | | | |
|---|---|---|---|
| 8,146,005 | B2 | 3/2012 | Jones |
| 8,195,673 | B2 | 6/2012 | Wilf |
| 8,285,654 | B2 | 10/2012 | Bajrach |
| 8,731,996 | B2 | 5/2014 | Kumagai |
| 8,954,343 | B2 | 2/2015 | Wright |
| 9,671,942 | B2 | 6/2017 | Fleury |
| 10,042,536 | B2 | 8/2018 | Goossens |
| 10,210,647 | B2 | 2/2019 | Guo |
| 10,419,375 | B1 | 9/2019 | Sokolov |
| 10,528,801 | B2 | 1/2020 | Arbatman |
| 10,679,130 | B2 | 6/2020 | Pinel |
| 11,165,725 | B1* | 11/2021 | Silverstein ............ H04L 67/306 |
| 2010/0205541 | A1* | 8/2010 | Rapaport .............. G06F 16/285 715/753 |
| 2011/0213211 | A1 | 9/2011 | Stevens |
| 2012/0265811 | A1 | 10/2012 | Bist |
| 2013/0096970 | A1 | 4/2013 | Boss |
| 2014/0129343 | A1 | 5/2014 | Finster |
| 2015/0051451 | A1* | 2/2015 | Kido ..................... A61B 5/0205 600/301 |
| 2015/0256634 | A1* | 9/2015 | Bastide .................. G06Q 50/01 709/204 |
| 2016/0128617 | A1 | 5/2016 | Morris |
| 2016/0203433 | A1 | 7/2016 | Chen |
| 2017/0069124 | A1 | 3/2017 | Tong |
| 2017/0147202 | A1 | 5/2017 | Donohue |
| 2017/0262431 | A1* | 9/2017 | Alam ..................... G06Q 10/00 |
| 2017/0262809 | A1 | 9/2017 | Martin |
| 2017/0364857 | A1 | 12/2017 | Suri |
| 2018/0101776 | A1* | 4/2018 | Osotio .................. G06F 16/258 |
| 2018/0181854 | A1* | 6/2018 | Koukoumidis ........ G06N 20/00 |
| 2018/0254914 | A1* | 9/2018 | Bastide ............... H04L 12/1827 |
| 2018/0286099 | A1 | 10/2018 | Kozloski |
| 2019/0297035 | A1* | 9/2019 | Fox .................. G06F 16/24575 |
| 2019/0325632 | A1 | 10/2019 | Rinker |
| 2020/0126670 | A1* | 4/2020 | Bender .................... A61B 5/74 |
| 2020/0134541 | A1 | 4/2020 | Ebner |
| 2020/0202603 | A1 | 6/2020 | Choi |
| 2020/0298131 | A1* | 9/2020 | Pinto ....................... A63F 13/87 |
| 2021/0083889 | A1 | 3/2021 | Chakra |
| 2021/0234823 | A1* | 7/2021 | Levkovitz ............... G06F 40/30 |

FOREIGN PATENT DOCUMENTS

| | | |
|---|---|---|
| KR | 20050015584 A | 2/2005 |
| KR | 100663921 B1 | 12/2006 |
| WO | 2005029414 A1 | 3/2005 |
| WO | 2008151421 A1 | 12/2008 |
| WO | 2012153320 A2 | 11/2012 |

OTHER PUBLICATIONS

Storm, Susan, "How Each Myers-Briggs® Type Reacts to Stress (and How to Help!)—Psychology Junkie", Last printed Sep. 27, 2020, 30 pages, <https://www.psychologyjunkie.com/2015/08/02/how-each-mbti-type-reacts-to-stress-and-how-to-help/>.

"100% Free Online Personality Test", Personality Perfect, downloaded from the internet on Oct. 14, 2021, 6 pages.

"Intelligent Cognitive Assistants", Semiconductor Research Corporation (SRC), Workshop Summary and Recommendations, May 12-13, 2016, 42 pages.

"Psychometric Tests & Personalilty Assessments", Psychometrics, downloaded from the internet on Oct. 14, 2021, 8 pages, <https://www.psychometrics.com/>.

"Pure Matching—Revolutionary matching algorithm", Pure Matching, downloaded from the internet on Oct. 14, 2021, 1 page, <https://www.purematching.com/>.

"System and method predict candidate fitment to a team's potential based on Team dynamics", An IP.com Prior Art Database Technical Disclosure, Authors et. al.: Disclosed Anonymously, IP.cpm No. IPCOM000259577D, IP.com Electronic Publication Date: Aug. 23, 2019, 7 pages.

Beal, Brendan, "Teaching Group Dynamics Using Virtual Reality," The New Social Worker, downloaded from the internet on Oct. 14, 2021, 5 pages, <https://www.socialworker.com/feature-articles/technology-articles/teaching-group-dynamics-using-virtual-reality/>.

Fiore et al., "Technology as Teammate: Examining the Role of Extended Cognition in Support of Team Cognitive Processes", Frontiers in Psychology, Published: Oct. 7, 2016, doi: 10.3389/fpsyg.2016.01531, 17 pages.

Mahardhika et al., "Team cognition model based on mutual beliefs and mental subgrouping", Journal of Interaction Science (2016) 4:1, Published online: Feb. 1, 2016, DOI 10.1186/s40166-016-0014-6, 10 pages.

Niebuhr et al., "Virtual reality simulations as a new tool for practicing presentations and refining public-speaking skills," Proceedings of the 9th International Conference on Speech Prosody 2018, Jun. 13-16, 2018, Poznan, Poland, DOI: 10.21437/SpeechProsody.2018-63, 6 pages.

Rammstedt et al., "Relationships between Personality and Cognitive Ability: A Facet-Level Analysis", Journal of Intelligence 2018, 6, 28, doi:10.3390/jintelligence6020028, Published: May 18, 2018, 13 pages.

Tidbury et al., "Initial evaluation of a virtual reality bomb-defusing simulator for development of undergraduate healthcare student communication and teamwork skills", BMJ Simulation and Technology Enhanced Learning, Publishing Online First Dec. 20, 2019, doi: 10.1136/bmjstel-2019-000446, pp. 229-231.

Tudor et al., "Virtual Audience Customization for Public Speaking Training Procedures", IEEE Virtual Reality 2013, Mar. 16-20, Orlando, FL, USA, pp. 61-62.

Espine et al., "Dynamic Pattern Generator", U.S. Appl. No. 17/569,676, filed Jan. 6, 2022.

Hatfield et al., "Intelligent Participant Matching and Assessment Assistant", U.S. Appl. No. 17/569,638, filed Jan. 6, 2022.

Karweta et al., "Intelligent Personality Matching with Virtual Reality", U.S. Appl. No. 17/569,711, filed Jan. 6, 2022.

List of IBM Patent Applications Treated as Related, filed Herewith, 2 pages.

* cited by examiner

SHARING PERSONALIZED DATA IN AN ELECTRONIC ONLINE GROUP USER SESSION

BACKGROUND

The present disclosure relates to electronic online computer sessions of a plurality of users or participants including group collaboration, and social networking on electronic media. More specifically, the present disclosure includes analyzing data regarding a user to suggest an action related to one or more users regarding a group discussion.

Currently, multiple individuals or user can communicate using electronic communication techniques which can include computers, mobile phones, collaboration or sharing software and/or services, and including a communications network such as the Internet. Multiple individuals can remotely collaborate, post messages, communicate, and have a group conversation via such techniques. Such group communications or collaborations can be convenient, efficient, and productive. However, some challenges can include lack of feedback from users in comparison to when participants are in a meeting room, i.e., at the same location collaborating. For example, it can be difficult to detect a person's body language and therefore difficult to ascertain a person's emotional state during a remote conversation.

SUMMARY

The present disclosure recognizes the shortcomings and problems associated with current techniques for users to participate in an electronic group meeting or collaboration using a communications network. One problem can include, for example, lack of feedback for online collaboration or brainstorming sessions using current techniques. For example, feedback can include body language which can enable discerning a user's possible emotional response to a group conversation. For example, the emotional response may be in response to an associated post which triggers the emotional response and is detectable by monitoring a user's/individual's biometrics, or trackable via changes in an individual's biometrics. For example, the embodiments of the present invention can determine a possible change in emotions based on a change in biometric data from an individual's baseline. A response can be determined based on the individual's personality type to possibly enhance collaborative effort of the individual and the group.

In an aspect according to the present invention, a computer-implemented method for assessing a state of a participant and sharing personalized data about the participant in an electronic group meeting or collaboration using a communications network includes receiving personalized data, at a computer, for a user participating in electronic group communications. The group communications include group collaboration by a plurality of users participating in the group communications and forming a group which includes the user. The group communications include communications via a communications network by the plurality of users in the group. Each of the users forming the group use a device with a computer, respectively, and the personalized data received at the computer includes biometric data and personality profile results. The biometric data includes biometric changes in real-time. The method includes detecting a biometric change in the user from a baseline for the user. The method further includes analyzing, in response to the biometric change, the biometric data and the personality profile results to determine an action regarding the user wherein the action is communicative to one or more of the plurality of users. An action is implemented regarding the group communications for addressing the biometric change in the user.

One advantage of the method according to the present invention includes facilitating a group discussion by suggesting or implementing an action to facilitate conflict resolution or advancement of the group discussion. An example can include analyzing a user state using data pertaining to the user, and in response to the user state, suggesting and/or implementing an action designed to facilitate the group discussion and/or the user's participation in the group discussion.

In a related aspect, the implemented action can include a communication to the user or another participant user of the group communications based on the analysis.

In a related aspect, the personality profile results can be generated from a personality test and received at the computer as part of the received data for use in the analysis.

In a related aspect, the personality profile results can be received at the computer from an online personality profile test or by a manual upload from a user.

In a related aspect, the method further can include identifying a communication in the group collaboration previous to the biometric change wherein the biometric change is probably in response to the communication. Further the method may include identifying a topic or subject of the identified communication, and use the topic or the subject of the identified communication as part of the analysis to determine the action.

In a related aspect, the biometric data can be received at the computer from one or more biometric measuring devices.

In a related aspect, the one or more biometric measuring devices may include at least one IoT (Internet of Things) device.

In a related aspect, the action can include one or more communicable responses, and the communicable responses can include addressing one or more of the participants.

In a related aspect, the action can include an alert and/or suggestion regarding the meeting and/or a health issue of the user, the alert and/or the suggestion being communicable to the user or another user.

In a related aspect, the action can include a suggested response for the user.

In a related aspect, the action can include a communication to one or more users of the group.

In a related aspect, the action can include a time parameter for a response for the user.

In a related aspect, the time parameter includes a time variable for communicating a message to one or more users of a group of participants.

In a related aspect, the method can include identifying the biometric change for the user, as part of the analyzing of the biometric data. The method can include identifying a communication in the group collaboration previous to the biometric change which probably initiated the biometric change in the user. The method can further include analyzing the personality profile of the user with respect to the biometric change, and determining the action based on the personality profile with respect to the biometric change to best respond to the identified communication.

In a related aspect, the action can include a best response to resolve a problem or move the group collaboration forward to a solution.

In a related aspect, the method can include receiving data for one or more users participating in the electronic group meeting, and detecting a biometric change for the one or more users, respectively, from a baseline for each of the users. The method can include analyzing, in response to the biometric change for each of the one or more users, the biometric data and personality profiles for each of the one or more users, and communicating one or more actions to one or more users of the group communications.

In a related aspect, the method can include monitoring, using the computer, a plurality of users participating in the electronic group collaboration, the monitoring occurring with permission of the plurality of users, and the plurality of users using the communications network for communicating as a group.

In a related aspect, the method includes detecting, from a plurality of IoT devices, for one or more of the plurality of users, respectively, a biometric change in a user from a baseline.

In a related aspect, the biometric change can indicate a probability of an increased stress level of a user of the plurality of users.

In a related aspect, the method can further include corresponding the biometric change to a change or an initial appearance of a post or communication in the group communications.

In a related aspect, one or more user's possible stress level can be communicated to the group in the group communication, based on the probability of the increased stress level of the user.

In a related aspect, the method can further include modifying a post or an attendee list of the group communications based on the biometric changes corresponding to the post in the group communications.

In a related aspect, the method can include associating a user having the biometric change to a personality type using the personality profile for the user. The method can further include modifying the post or an attendee list based on the personality type of the user, and/or presenting a list of preferred responses, with respect to the personality type of the user, to the user or one or more of the plurality of users in the group.

In a related aspect, the method can include monitoring, using the computer, biometrics of a plurality of users, respectively, the monitoring occurring with permission of the plurality of users, and the users using the communications network for communicating as a group. The method can further include detecting, from a plurality of IoT devices, a biometric change in a user from a baseline, wherein the biometric change indicates a probability of an increased stress level of the user, and corresponding the biometric change to an event or initial appearance of a post in the group communications. The method can further include associating a user having the biometric change to a personality type using the personality profile. The method can include modifying the post or an attendee list based on the analysis of the biometric data and the personality type for the user, and/or presenting one or more preferred responses based on the analysis to the user or to other users in the group in response to the event.

In a related aspect, the method can include communicating one or more users' possible stress levels to the group in the group communication, based on the possible increased stress level of the user.

In a related aspect, the method can include identifying the biometric change for the user, as part of the analyzing of the biometric data, and identifying a communication in the group collaboration previous to the biometric change having a probability of initiating the biometric change for the user.

The method can include analyzing the personality profile of the user with respect to the biometric change, and determining an action based on the personality profile with respect to the biometric change to best respond to the identified communication.

In a related aspect, the action can include a best response to resolve a problem or move the group collaboration forward to a solution.

In another aspect according to the present invention, a system assesses a state of a participant and shares personalized data about the participant in an electronic group meeting or collaboration using a communications network includes a computer system comprising; a computer processor, a computer-readable storage medium, and program instructions stored on the computer-readable storage medium being executable by the processor, to cause the computer system to perform the following functions to: receive personalized data, at a computer, for a user participating in electronic group communications, the group communications including group collaboration by a plurality of users participating in the group communications and forming a group which includes the user, the group communications include communications via a communications network by the plurality of users in the group, each of the users forming the group using a device with a computer, respectively, the personalized data received at the computer including biometric data and personality profile results, the biometric data including biometric changes in real-time; detect a biometric change in the user from a baseline for the user; analyze, in response to the biometric change, the biometric data and the personality profile results to determine an action regarding the user wherein the action is communicative to one or more of the plurality of users; and implement the action regarding the group communications for addressing the biometric change in the user.

One advantage of the system according to the present invention includes facilitating a group discussion by suggesting or implementing an action to facilitate conflict resolution or advancement of the group discussion. An example can include analyzing a user state using data pertaining to the user, and in response to the user state, suggesting and/or implementing an action designed to facilitate the group discussion and/or the user's participation in the group discussion.

In another aspect according to the present invention, a computer program product assesses a state of a participant and shares personalized data about the participant in an electronic group meeting or collaboration using a communications network. The computer program product comprising a computer readable storage medium having program instructions embodied therewith, the program instructions executable by a computer to cause the computer to perform functions, by the computer, comprising the functions to: receive personalized data, at a computer, for a user participating in electronic group communications, the group communications including group collaboration by a plurality of users participating in the group communications and forming a group which includes the user, the group communications include communications via a communications network by the plurality of users in the group, each of the users forming the group using a device with a computer, respectively, the personalized data received at the computer including biometric data and personality profile results, the biometric data including biometric changes in real-time; detect a biometric change in the user from a baseline for the user; analyze, in response to the biometric change, the biometric data and the personality profile results to determine an action regarding the user wherein the action is communicative to one or more of the plurality of users; and implement the action regarding the group communications for addressing the biometric change in the user.

One advantage of the computer program product according to the present invention includes facilitating a group discussion by suggesting or implementing an action to facilitate conflict resolution or advancement of the group discussion. An example can include analyzing a user state using data pertaining to the user, and in response to the user state, suggesting and/or implementing an action designed to facilitate the group discussion and/or the user's participation in the group discussion.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments according to the present disclosure can includes systems and methods for sharing non-standard biometrics with users in a group communicating electronically using a communications network. The systems and method can include identifying a neuro-emotional trigger, e.g., whether verbal or written, or an event, that could be, that is, has a probability of being, a catalyst for a biometric change for one or more of the users during the electronic collaboration session. The system and method, in response to the biometric change, can present personalized response recommendations to respective users based on an individual's associated personality preference. And, in another example, the system and method can initiate an automated action or response.

Figure 1:
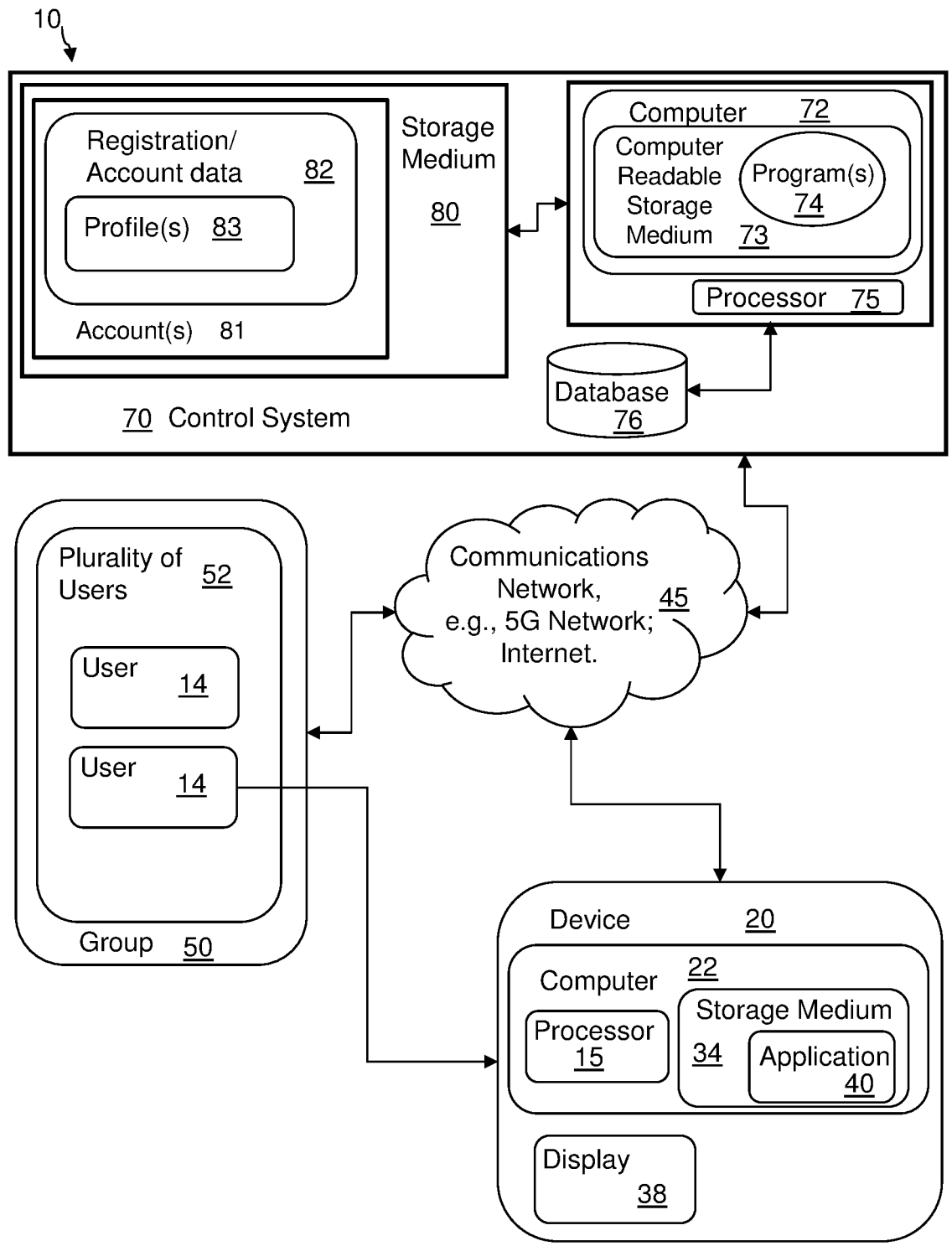
FIG. 1 is a schematic block diagram illustrating an overview of a system, system features or components, and methodology for assessing a state of a participant and sharing personalized data about the participant in an electronic group meeting or collaboration using a communications network, according to an embodiment of the present disclosure.
Figure 2:
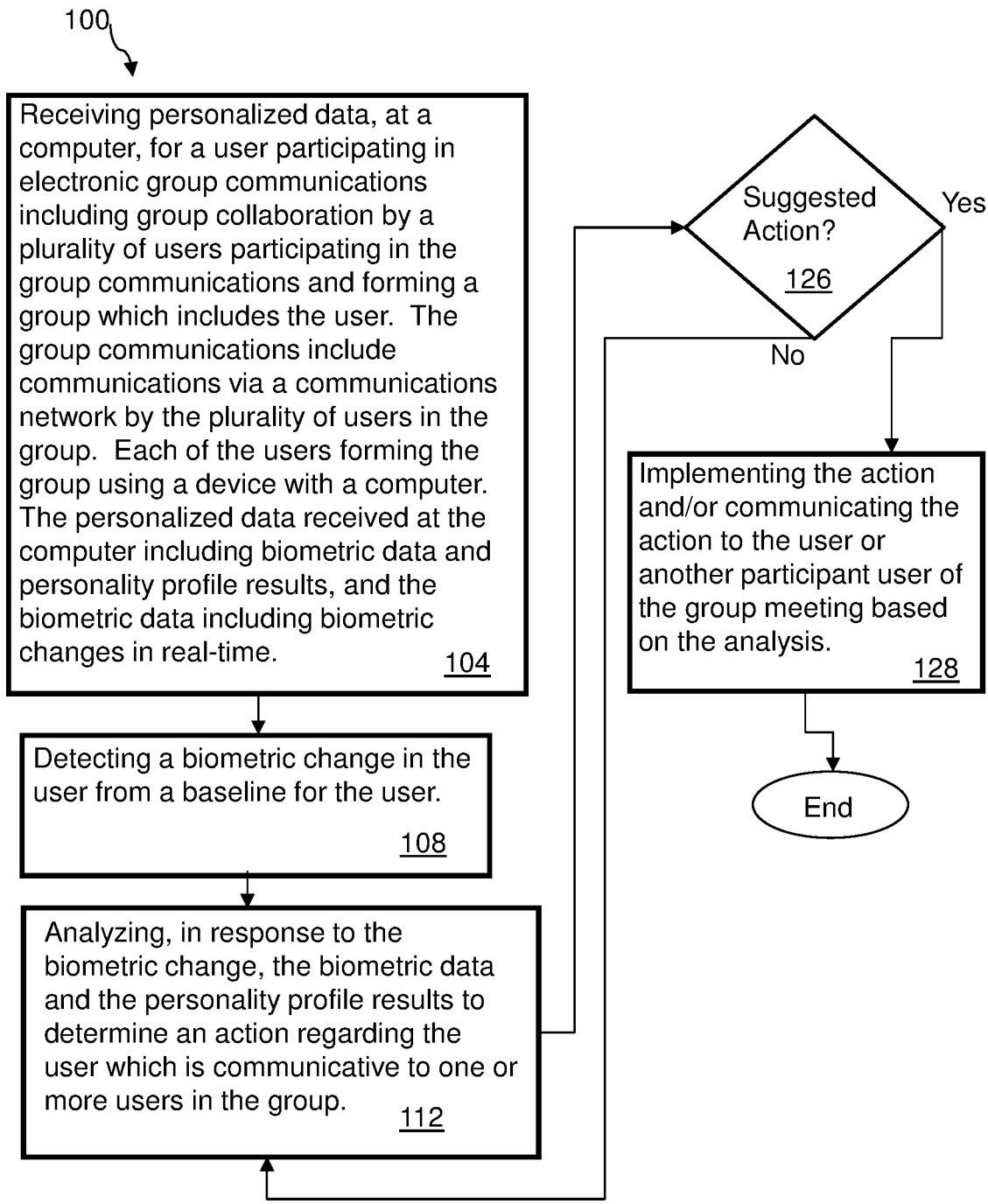
FIG. 2 is a flow chart illustrating a method, implemented using the system shown in FIG. 1, for assessing a state of a participant and sharing personalized data for the participant in an electronic group meeting or collaboration using a communications network, according to an embodiment of the present disclosure.

Referring to FIGS. 1 and 2, a computer-implemented method 100 (FIG. 2) with reference to a system 10 (FIG. 1) according to an embodiment of the present disclosure is provided to assess a state of a participant, using data for the participant in an electronic group meeting or collaboration using a communications network. A participant can be referred to herein, but not limited to, as a user, participant, individual, attendee, or person, etc.

Figure 5:
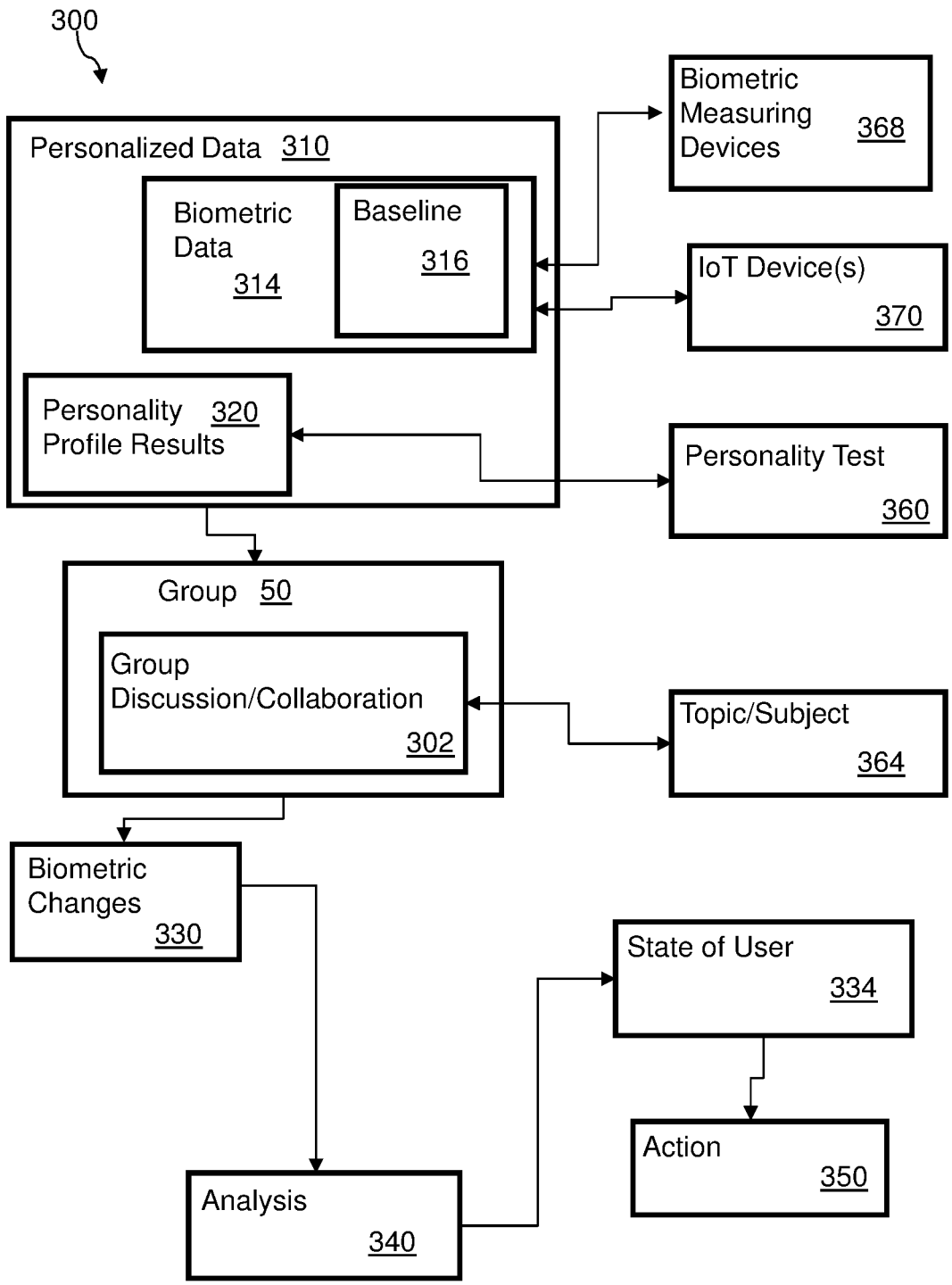
FIG. 5 is a functional schematic block diagram showing a series of operations and functional methodologies, for instructional purposes illustrating functional features of the present disclosure associated with the embodiments shown in the FIGS., for assessing a state of a participant and sharing personalized data for the participant in an electronic group meeting or collaboration using a communications network.

Additionally, the methods and systems according to embodiments of the present disclosure are discussed with reference to FIG. 5, which depicts a functional system 300 including components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

The method 100 shown in FIG. 2 includes a series of operation blocks for implementing one embodiment according to the present disclosure. The method 100 includes receiving personalized data, at a computer, for a user participating in electronic group communications including group collaboration or meetings by a plurality of users participating in the group communications and forming a group 50 which includes the user, as in block 104. The group communications include communications via a communications network by the plurality of users in the group. Each of the users forming the group use a device with a computer, such as, but not limited to, a laptop or a mobile device. The personalized data received at the computer includes biometric data and personality profile results, and the biometric data includes biometric changes 330 (FIG. 5) in real-time, as also referred to in block 104.

For example, as shown in FIG. 1, a user 14 is shown as representative of a plurality of users. The user 14 is communicating, using a device 20, with each of the users in the group of users 50. The device is representative of devices for each of the users, which are not shown. The device 20 includes a computer 22 having a storage medium 34 which can include an application 40 embodying the method of the present disclosure. The computer 22 further includes a processor 15 for executing the application/software. The device 20 also communicates with a display 38 or monitor. In one example, the group 50 is communicating with each other as users via a communications network 45, e.g., the Internet, for example, having a group discussion or collaboration 302 (FIG. 5).

The method 100 includes detecting a biometric change in the user from a baseline 316 for the user, as in block 108. A biometric change can include, for example, a change in a person's blood pressure or pulse. Such biometric changes can be detected using one or more biometric measuring devices 368, for example, sensors attached to a person. The measuring devices or sensors can communicate biometric data to a person's/user's, computer or device, and/or a remote computer system or server, embodying an application and/or software incorporating the method of the present disclosure. The software can also be stored and running, in whole or in part, part from a remote computer or a control system having a computer. And, data, such as personalized data 310 (FIG. 5), can be communicated to the remote server or control system from the application and/or the user's devices relating to the communications, personality profile results and biometric data.

For example, a personality profile and biometric data can be included, at least in part, in an analysis for determining a state of a user 334 or participant of the group collaboration or communication. In one example, a state of a user can be estimated and/or approximated and/or a probability determined for purposes according to the present disclosure using biometric data, alone or in combination with a personality profile for the user. In one example, a state of a user can include a health issue for a person, which can include, for example, a pulse rate or other indicators of a possible emotional state of a user and/or a possible medical state of a user.

Biometric changes can also be detected and communicated using Internet of Things (IoT) devices 370. A baseline 316 (FIG. 5) of one or more biometric reading for a user can be collected and stored. It is understood that such data collection is done with the knowledge and consent of a user, and stored to preserve privacy, which is discussed in more detail below. Such biometric data can include readings, such as, blood pressure, and pulse. In another example, using cameras, the method and system can detect perspiration levels, which can indicate a person is agitated, and possible agitation from a person's facial expression and/or body movements including hand gestures.

In one example a user can register 82 have an account 81 with a user profile 83 on a control system 70, which is discussed in more detail below. The account can store data for a user including the biometric data and baseline data for the user, as well as personality profile results. For example, personality profile results 320 can be uploaded to a user profile by the user. Personality profile results can be obtained by a user using available computer software programs which, in one instance, can be available on-line. Other types, brands, and variations of personality profiles may be available and used by a user, which can be part of the analysis according to the methods and systems of the present disclosure.

Again referring to FIG. 2, the method 100 includes analyzing 340 (FIG. 5), in response to the biometric change 330, the biometric data 314 and the personality profile results 320 to determine an action 350 regarding the user. The action can include a communication or be communicative to one or more users in the group, as in block 112. For example, an action can include a suggested action to the user or one or more users in the group. In another example, an action can be sharing with users in the group communication a message or communication and the action can include, for example, sharing a conclusion or possibility of a user's stress with other users, or suggesting a response or comment to one or more users. In another example, an action can be suggesting to the group or automatically removing a topic, changing a topic, or suggesting to the group or removing a user. In another example, an action can include a communication suggesting a user do nothing. The combination of biometric changes, with respect to a level of change from a baseline, and identified methods to respond to an individual participant, which is based on the individual participant's profile, can provide an improved technique for response.

The method includes implementing the action and/or communicating the action or a suggested action to the user or another participant user of the group meeting based on the analysis, as in block 128. In one example, a communication can include a text message. In another example, a text message can be sent to one or more users. In another example, a communication can include an instruction for a user to modify a post or an attendee list for the group. In another example, the communication according to the method can include automatically modifying a post or an attendee list for the group. Modifying the attendee list, as in the above examples, can include removing a person from the list or adding someone from the list or both, or in another example, temporarily removing some from an attendee list. For example, the instructions to modify a post can be presented by changing a color of text, flashing text, or background of the post to the original participant or another participant. The modification recommendation can include, but is not limited to, changes based on the personality profile of the participant with detectable biometric changes. Based on a participant's profile, the system can recommend, for example, less controversial terms.

In one example according to the methods and systems of the present disclosure, the personality profile results 320 can be generated from a personality test 360 and received at the computer as part of the received personalized data for use in the analysis. In one instance, the personality profiles results can be uploaded by the user.

In one example, the method includes receiving the personality profile results at the computer from an online personality profile test or from a manual upload. For instance, an online personality profile can include a user entering data for an online text/assessment, and the user initiates sending of the results for use in the method of the present disclosure. For example, the results can be sent to and received at the control system 70. In another example, a user can upload personality profile test results, for instance, using the Internet, to upload results to the control system 70, in one example, as part of the user's profile 83.

In one example, a plurality of users in a group can post to an electronic board. Selected individuals in the group can see recommended communication protocol changes based on possible physiological changes of a user founded on a biometric change for the user. The biometric change can coincide with one or more electronic communications. Biometric feedback standards can be used to analyze personalized data for the user, such as a device streaming data from an IoT device.

OTHER EMBODIMENTS AND EXAMPLES

In another embodiment according to the method and system of the present disclosure, a method can include identifying a communication in the group collaboration previous to the biometric change which could have initiated the biometric change in the user, for example determine that communication or event in the group collaboration has a probability of being the communication or event that caused or initiated the biometric change. For example, a communication in the group collaboration can be identified as prior to a biometric change for one of the users, with respect to a timeline of events. For example, one or more events can be timestamped, and the timestamp used to correlate an event with a change in biometric data which can also be timestamped. In another example, a timestamped of a post by a user as an event, can be timestamped and likewise correlated to a biometric change of one or more users. In one example, the communication can be immediately prior to the biometric change, that is, without any intervening communications between the communication and the detected biometric change in a timeline of events. The method includes identifying a topic or subject 364 of the identified communication, and using the topic or the subject of the identified communication as part of the analysis 340 to determine the action. In one example, as in the analysis, in response to the biometric change 112 of the method 100.

In another example, the biometric data can be received at the computer from one or more biometric measuring devices. In another example, one or more biometric measuring devices can include at least one IoT (Internet of Things) device.

In one example, an action can include one or more communicable responses, and the communicable responses include addressing one or more of the participants.

In another example, an action can include an alert and/or suggestion regarding the meeting and/or a health issue of the user. In one example, an action can include a suggestion to the user including, for example, a health-related suggestion and/or a subject related suggestion. In one example, a health-related suggestion can include alerting a user of their blood pressure or pulse readings, such as their blood pressure is elevated. In another example, a subject related suggestion can include for example, alerting a user that a subject seems to elevate their blood pressure or pulse. As discussed above, such a conclusion can be made by analyzing the timing of a subject in the group discussion and blood pressure or pulse readings, for example, a topic or subject is detected, and a biometric reading changes, such as elevated blood pressure or pulse, immediately after the subject or topic is introduced. The method and system can determine and conclude that there is a cause and effect relationship between the subject or topic being introduced and the biometric change. Such determination using timing between the topic and a biometric change can also include a lack of intervening topics between the event, the introduction of the topic, and the biometric change. In another example, the method and system can also determine that an event, such as a detected conversation did not introduce a meaningful topic or subject. For example, a conversation could be routine and non-controversial, and the method can determine that it is not a meaningful conversation that would trigger a biometric response. This determination could be made by identifying the event, for instance a conversation or comment, relating the conversation or comment to a topic or subject of the group discussion, and determining that the conversation or comment does not relate to the topic or subject of the group discussion therefore lacking relevance to the group discussion. The method can conclude that the conversation or comment lacking relevance to the group discussion did not trigger or cause a biometric change in a user. The method can then proceed to relate another conversation or comment to the subject or topic of the group discussion and proceed to relate the biometric change to the another conversation or comment which can in one example change the subject or topic, as a probable cause of the biometric change. In this example, the method and system can determine that there was a topic introduced, which could be related to a biometric change, and determine that another conversation or text was inconsequential with respect to the biometric change. Such determinations can be made regardless of the timing of the introduced conversation or comment, as the determination of relevance to the biometric change is made by determining relevance to the topic or subject of the group discussion and not an immediately preceding event to a biometric change. As discussed above, in another example, the method can determine a cause of a biometric change by determining an immediately preceding event, such as a conversation or comment, and determine that such event was the probable cause of the biometric change.

In another example, an action can include a response for the user. For example, a response can include a text or verbal response for a user to use in the group discussion.

In another example, an action can include a request for the user to communicate to one or more users of a group of participants. For example, the action according to a method and system can include suggesting a request for one user to communicate a message to another user. For instance, an action can include suggesting that one user communicating with another user. In one example, a user can have a rapport with another user and thus the method and system can suggest the user to communicate with another user or communicate a specific message with the another user.

In another example, an action can include a lack of responding or communication between one user and another user or more than one user. In another example, an action can include a lack of responding or communicating for a defined time period. In another example, an action can include timing for a response for the user, that is, a time parameter, and thus the timing can include a time variable for the action. For example, the time variable can include a time range for an action, or a suggested time to carry out the action. For instance, suggesting a user talk to another user after the group discussion or at or after a specific time.

In another example, timing can include a time variable for communicating a message to one or more users of a group of participants. In another example, an action can include alerting another user participating in a group meeting.

In another example, an action can be communicated to another participant and can include a response to the user, in other words, a response or communication to the user can be communicated by another participant.

In another example, an action communicated to the user can include timing for the action or suggested action to the user from the another participant. The action can include communicating a message with the timing and the timing can include a time variable for communicating the message.

In further example, an action can be directed to the a user and/or another user and can be selected from a group consisting of: a speaking suggestion, a suggestion to not speak or respond, communicating a message to one or more users, not communicating with one or more users, and communicating a message with timing wherein timing includes a time variable for communicating the message.

In another embodiment, a method according to the present disclosure can include identifying the biometric change for the user, as part of the analyzing of the biometric data, for example, as in block 112 of the method 100. A communication in the group collaboration can be identified previous to the biometric change which could have initiated the biometric change in the user. A method can include analyzing the personality profile of the user with respect to the biometric change, and determining an action based on the personality profile with respect to the biometric change. The action can include a best response to the identified communication, and the action can include a suggested action. In one example, a suggested action can include a best response to resolve a problem or move the group collaboration forward to a solution. For instance, a method can identify a topic or problem from the group discussion, and suggest an action for resolving the problem, for example, reminding the group that a participant of the group discussion has an expertise that could be relevant for resolving the problem, or alerting a participant with a specific expertise of a topic or problem.

In another embodiment according to the present disclosure, a method and system can include receiving data for one or more users participating in the electronic group meeting. The data can include biometric data and personality profile results. A biometric change for one or more of the users can be detected, respectively, from a baseline for each of the users. In response to the biometric change for each of the one or more users, the biometric data and personality profiles for each of the one or more users can be analyzed. One or more actions or suggested actions with one or more users of the group meeting can be communicated. In one example, the method and system can include monitoring, using the computer, a plurality of users participating in the electronic group collaboration. The monitoring can occur with permission of the plurality of users, and the plurality of users can use the communications network for communicating as a group. In another example, the method can include detecting, from a plurality of IoT devices, for one or more of the plurality of users, respectively, a biometric change in a user from a baseline. The biometric change can indicate a probability of an increased stress level of a user of the plurality of users. The method can include corresponding the biometric change to a change or initial appearance of a post or communication in the group communications. The method can include communicating one or more user's stress level to the group in the group communication, based on the probability of an increased stress level of a user.

In one example, a post or an attendee list of the group communications can be modified based on the biometric changes corresponding to a post in the group communications.

In another example, a user having the biometric change can be associated to a personality type using the personality profile for the user. The post or the attendee list can be modified based on the personality type of the user, and/or presenting a list of preferred responses to the user or the users in the group, with respect to the personality type of the user.

In an embodiment according to the present disclosure, a method and system can include monitoring, using the computer, biometrics of a plurality of users, respectively. The monitoring can occur with permission of the plurality of users, and the users can use the communications network for communicating as a group. The method and system includes detecting, from a plurality of IoT devices, a biometric change in a user from a baseline, wherein the biometric change indicates a probability of an increased stress level of the user. The method and system includes corresponding or matching the biometric change to a change or initial appearance of a post in the group communications.

The method and system continues by including associating a user having the biometric change to a personality type using the personality profile. The post or an attendee list can be changed based on the analysis of the biometric data and the personality type for the user. Other actions can include presenting one or more preferred responses based on the analysis to the user or to other users in the group in response to the event. In one example, one or more user's stress level can be communicated to the group in the group communication, based on the probability of the increased stress level of the user.

In another example, the method and system can include identifying the biometric change for the user, as part of the analyzing of the biometric data. The method and system can include identifying a communication in the group collaboration previous to the biometric change which could have initiated the biometric change in the user, and analyzing the personality profile of the user with respect to the biometric change. The method and system can include determining an action based on the personality profile with respect to the biometric change to best respond to the identified communication, and the action including a suggested action. In another example, the action can include a best response to resolve a problem or move the group collaboration forward to a solution.

Additional Embodiments and Examples

Figure 3:
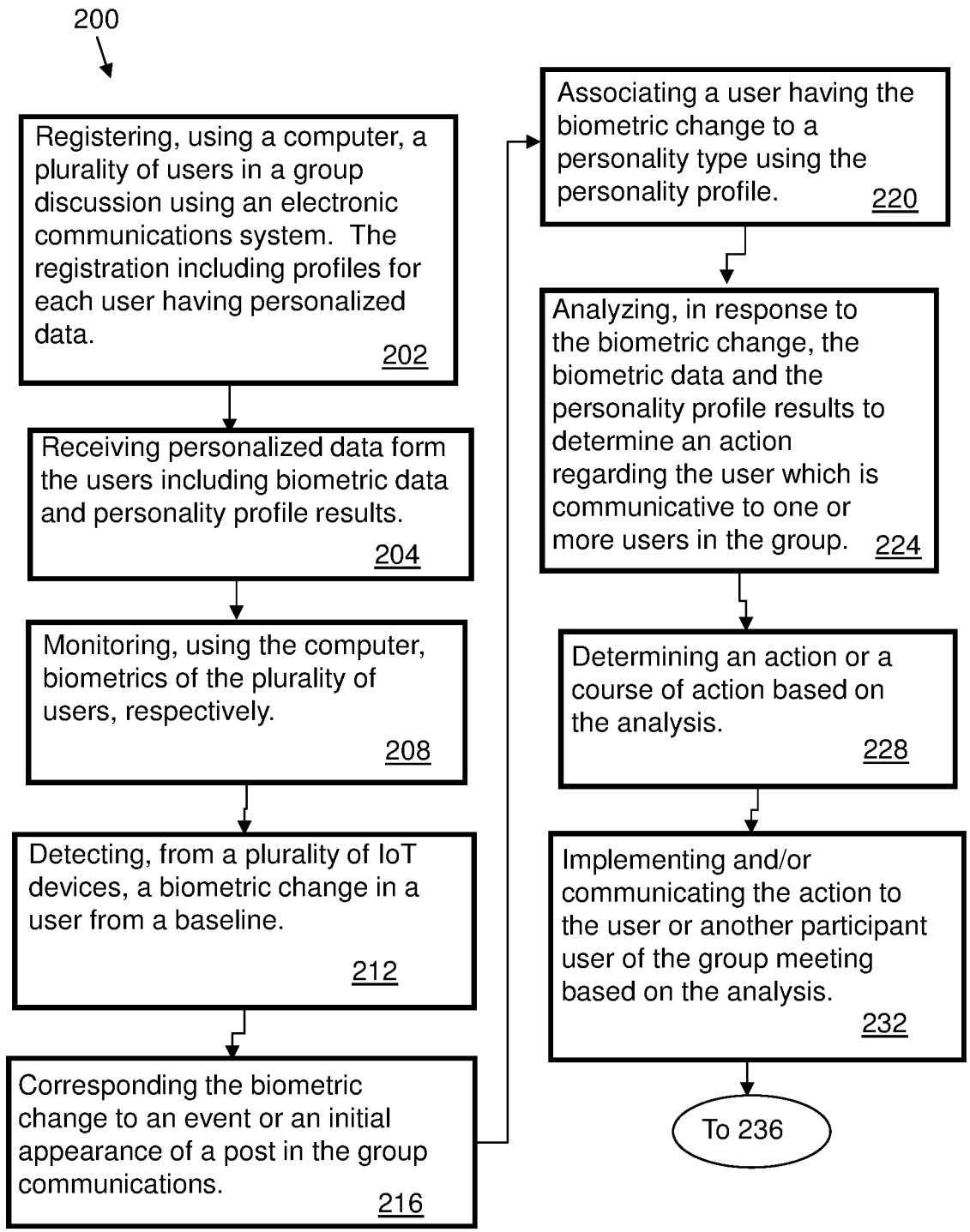
FIG. 3 is a flow chart illustrating another method, implemented using the system shown in FIG. 1, for assessing a state of a participant and sharing personalized data for the participant in an electronic group meeting or collaboration using a communications network, according to an embodiment of the present disclosure.
Figure 4:
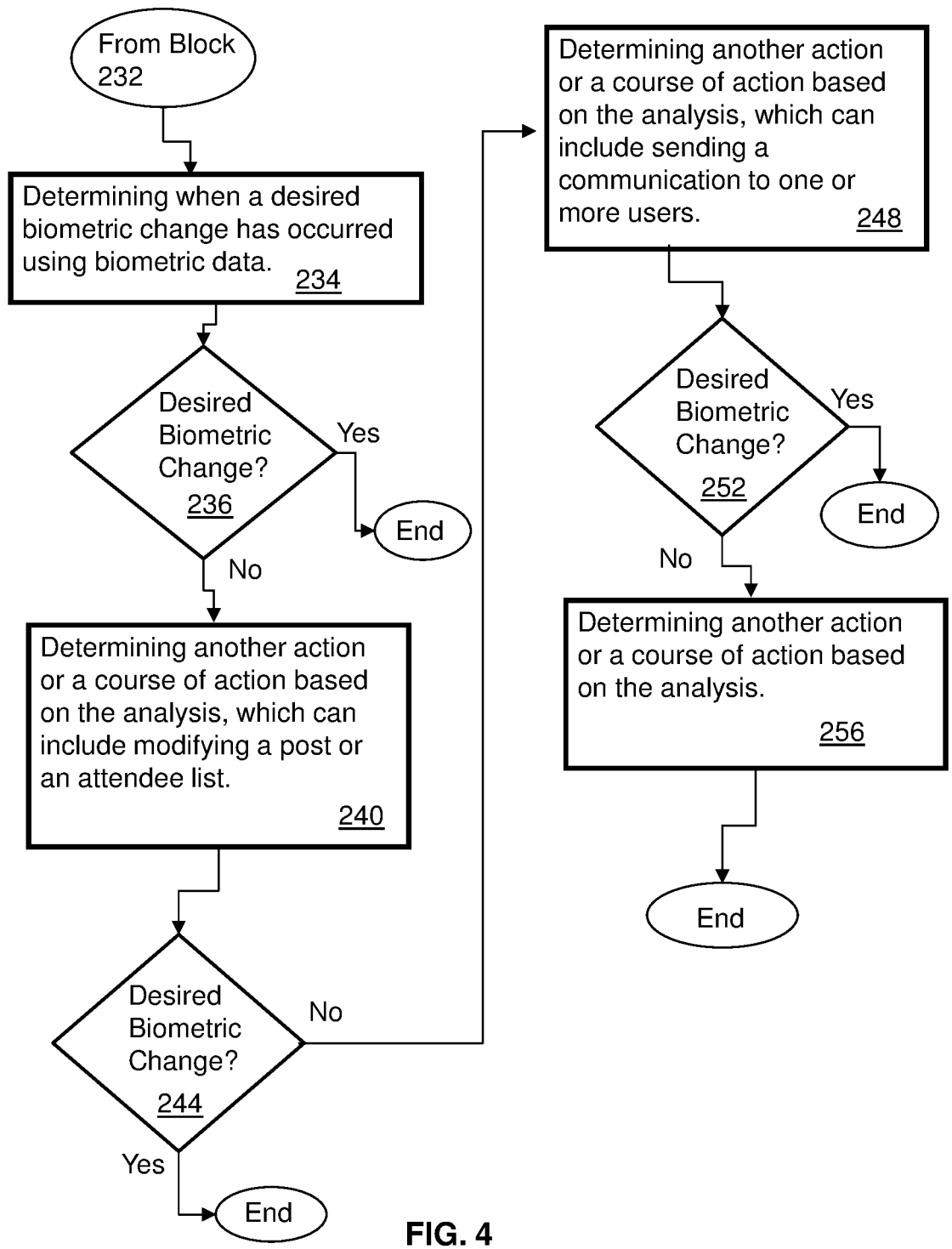
FIG. 4 is a flow chart continuing from the flow chart shown in FIG. 3 depicting a continuation of the method shown in FIG. 3, according to an embodiment of the invention.

Referring to FIG. 1 and FIGS. 3 and 4, a method 200 for assess a state of a participant using data for the participant in an electronic group meeting or collaboration using a communications network includes a series of operation blocks for implementing one embodiment according to the present disclosure. A method 200 according to an embodiment of the present disclosure includes registering, using a computer, a plurality of users in a group discussion using an electronic communications system, as in block 202. The registration can include profiles for each user having personalized data. For example, users can register using a website via their computer and GUI (Graphical User Interface) interface. The registration or account data 82 can include profiles 83 for an account 81 for each user. Such accounts can be stored on a control system 70, which can also include a database 76 for data storage.

Operational blocks of the method 200 shown in FIGS. 3 and 4 may be similar to operational block shown in FIG. 2. The method shown in FIGS. 3 and 4 is intended as another example embodiment which can include aspects/operations shown and discussed previously in the present disclosure.

The method includes receiving personalized data from the users including biometric data and personality profile results, as in block 204. Further, the method includes monitoring, using the computer, biometrics of the plurality of users, respectively, as in block 208. The method includes detecting, from a plurality of IoT (Internet of Things) devices, a biometric change in a user from a baseline, as in block 212.

The method further includes corresponding the biometric change to an event or an initial appearance of a post in the group communications, as in block 216. Further the method includes associating a user having the biometric change to a personality type using the personality profile, as in block 220.

The method 200 includes analyzing, in response to the biometric change, the biometric data and the personality profile results to determine an action regarding the user, as in block 224.

The method includes determining an action or a course of action based on the analysis, as in block 228, and implementing and/or communicating the action to the user or another participant user of the group meeting based on the analysis, as in block 232.

The method includes determining when a desired biometric change has occurred using biometric data, as in block 234. For example, real-time biometric data can be assessed to determine a change in biometric data from a user after a recommended action has been communicated. The change in biometric data can be assessed and a determination made whether the communication was successful and/or that a desired biometric change occurred, as in block 236. For example, the method can determine when a biometric change is a desired change, for instance receiving a reduced blood pressure or pulse reading from a user.

When a desired biometric change has occurred, at block 236, the method ends. When a desired biometric change has not occurred, the method can proceed to determine another action or a course of action based on the analysis, which can include modifying a post or an attendee list, as in block 240. For example, a desired biometric change can include waiting for a specified time period and then assessing biometric data. In another example, an action which includes modifying a post can include automatically changing or removing a post to affect a desired biometric change. In another example, modifying an attendee list can include adding or removing a user from an attendee list for a group communication.

When a desired biometric change has occurred, at block 244, the method ends. When a desired biometric change has not occurred, the method can proceed to determine another action or course of action based on the analysis, which can include sending a communication to one or more users, as in block 248.

When a desired biometric change has occurred, at block 252, the method ends. When a desired biometric change has not occurred, the method can proceed to determine another action or course of action based on the analysis, as in block 256.

Further Embodiments and Examples

Therefore, using the embodiments of the present disclosure multiple individuals can collaborate remotely using the appropriate methods to communicate with individuals. Using the present disclosure, a possible emotional response associated with a post may be trackable via changes in an individual's biometrics. In addition, understanding the changes in emotions from an individual's baseline and how to respond based on their personality type can enhance the collaborative effort.

Further, embodiments of the present disclosure can extend the capabilities of online communications tools by determining an individual's preferences based on their personality profile and capturing biometric changes. For example, a user's preferences can include preferred communication methods based on the user's personality profile. Biometric changes can be captured that signal a potential change in an individual's response to what has been presented by other online collaborators.

Embodiments are envisioned as opt-in systems where a person agrees to the a using biometric data and personality profiles and provides secure access to their IoT devices to enable the system, and the user can remove the sharing of data captured by their devices. A user interface can also allow an individual to remove all their historical biometrics. Additionally, the entry of personality profiles is optional and can also be removed from a system upon discretion of the user.

In another example, IoT devices can be used to capture an individual's biometrics as a group of people are posting to an electronic board. A pattern can be used with a personal model to allow selected individuals to see recommended communication protocol changes based on possible physiological changes of a user that can coincide with one or more electronic communications. In combination, when the device's streaming data analysis determines that an individual's biometrics have changed using acknowledged biofeedback standards, an analysis can be performed to show expected ways to effectively respond to an individual based on a personal collaboration portrait generated for a user. In one example, collaboration portraits can be created as an individual registers for a system for dimensional positioning analysis using an array of behavioral profiles and related techniques (e.g., to position strength/weakness, communication style and self-perception; models for resilience to position and rank positive potential to available responses). Potential responses can be initially captured when a system is being calibrated to create a foundational set of responses, with periodic updates as new responses are observed and added. Factorial combinations of participant portraits can be matched to a stressed individual's portrait against a library of potential responses and analyzed through the system to identify a top ranked response for each individual as well as additional ranked potential responses, such as next highest ranked potential responses. In one example, the system can track changes that were made to a collaboration board that correspond to changes in biometric levels. In another example, eye tracking can be detected using a camera to determine which post was being read. The system can store biometric information for an individual as historical data, and can use the historical data to compare to a norm for an individual. In one example, comparing to an individual's norm allows the identification of times when a person is responding differently based on statistically different biometrics which should be known to the crowd. When statistically significant changes in stress level are detected, the system can read the configured associated personality corpus (for example, this can be positive or negative changes). A post or attendee list can be modified (saturation/pattern) to identify a change in stress, and the best responses for a personality preference can be presented to an audience of collaborators. In another example, an individual can choose to allow all or a subset of the attendees access to their information.

In another example, biometric levels can be captured on a continuum, and timestamped at incremental intervals. Events that have/or are occurring are timestamped. Timestamps are compared to correlate a change in biometric data for a user. Biometric levels can be determined and timestamped. The method and system can modify a display of shared content that all or in part is believed or determine to cause stress. The system can modify the display of content related to the changes in stress level of one or more of the participants based on their reaction, as determine using the biometric feedback. The system can share personality portraits of individuals who have opted-in to the system consented to such sharing, and a determined recommended response can be made available based on statistical recommendations. In another example, a learning loop can be included to allow for individuals to update quality or edit a response regardless of biometric change.

Thereby using the embodiment of the present disclosure, systems and methods for sharing non-standard biometrics and identifying a neuro-emotional trigger that can be a catalyst for the biometric change in the electronic collaboration session is disclosure. And, the systems and methods present personalized response recommendations based on an individual's associated personality preferences.

Therefore, the systems and method according to the present disclosure can include an electronic collaboration tool which can interface with an individual's registered IoT devices to create a baseline, and then present current deviations from that baseline (e.g., higher/lower stress) to the extended audience. The individuals can also enter their personality type into a data base and/or application or software user profile so that others know effective ways to respond to the individual who may be becoming stressed and the others can respond in consideration of degree or intensity.

For example, a system can receive feeds from registered IoT devices to determine a stress level. The system can track any changes that were made to a collaboration board that can correspond to an emotional level. In another example, eye tracking using a camera can determine which post was being read by a user. If a biometric change is detected from the user, and a time sequence indicates that the user read the post and then subsequently the biometric change occurred, as discussed previously, the system can make a determination that the post may have upset or contributed to an emotional change to the user. In response, an action regarding the post can be suggested or implemented. For example, all or part of the post can be modified or eliminated. The system can store biometric data which possibly relates to stress levels for an individual as historical data and can use the historical data to compare to a norm or baseline for an individual (comparing to an individual's norm allows the identification of times when a person is responding differently to stress). When stress or strong emotions are identified based on biometric data compared to biometric norms or baselines, the system can read a personality profile for the individual. A post can be modified or an attendee list can be modified (saturation/pattern) in response to a change in biometric data which can indicate stress, and a best responses for a personality type can be presented to the user or all or part of an audience. Thereby, the system and method provides for sharing non-standard stress levels and identifying a neuro-emotional trigger that could be the catalyst for an increased stress level of one or more users in an electronic collaboration session.

By way of the embodiments and examples in the present disclosure, a computer enabled system and method can determine and share stress levels in an electronic communication through the user experience (UX). The system and method can include determining an approximate level of stress for an individual using biometric feedback, and comparing a current stress level to an individual's baseline biometrics. The system and method can determine a topic that coincides with a change in stress as indicated by a biometric change. The determination of a topic can be implemented or approximated by analyzing timestamps for a biometric change and a post or topic being discussed in a group conversation. For example, a biometric change may occur around the time, or subsequent to the time of a post or a topic discussion. An action can be shared with collaborator in the group conversation wherein the action can include, for example, sharing a conclusion or possibility of an individual's stress with collaborators, or suggesting a response or comment to one or more collaborators, or suggesting or automatically removing a topic, changing or topic or suggesting or removing a user. In one example, IoT devices can be used to measure biometrics that help identify or approximate a stress level in a user. In another example, an individual's historical stress level can be stored. In another example, the system and method can include identifying an event such as a post, topic or subject that may have caused biometric changes and stress in a user, based on a user posting at the time of the deviation in the biometric data. An event can be identified that may have caused user stress based on analyzing image feeds and what the user was reading on an electronic board. In one example, a system and method can include modifying a posted topics, or a participants list to identify what initiated biometric changes or reduce a level of stress is a user. In another example, the system and method can include communicating an individual's personality type and a recommended response to detected or determined user stress in the group communications or UX.

More Examples and Embodiments

Figure 8:
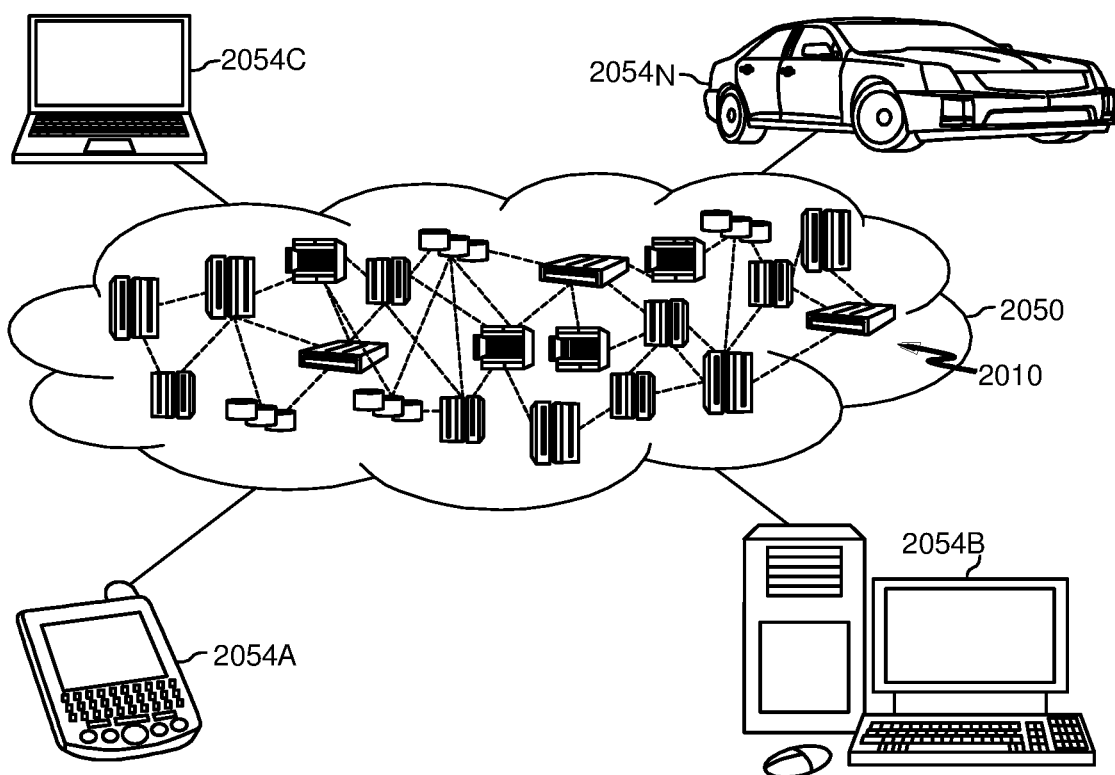
FIG. 8 is a block diagram depicting a cloud computing environment according to an embodiment of the present invention.

In the embodiment of the present disclosure shown in FIGS. 1 and 2, a computer can be part of a remote computer or a remote server, for example, remote server 1100 (FIG. 8). In another example, the computer 72 can be part of a control system 70 and provide execution of the functions of the present disclosure. In another embodiment, a computer 22 can be part of a mobile device 20 and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the mobile device 20 can include a computer 22 having a processor 15 and a storage medium 34 which stores an application 40. The application can incorporate program instructions for executing the features of the present disclosure using the processor 15. In another example, the mobile device 20 application 40 can have program instructions executable for a front end of a software application incorporating the features of the method of the present disclosure in program instructions, while a back end program or programs 74, of the software application, stored on the computer 72 of the control system 70 communicates with the mobile device computer and executes other features of the method. The control system 70 and the mobile device 20 can communicate using a communications network 45, for example, the Internet.

Thereby, the method 100 according to an embodiment of the present disclosure, can be incorporated in one or more computer programs or an application 40 stored on an electronic storage medium 34, and executable by the processor 15, as part of the computer on the mobile device 20. For example, a human speaker or user 14 has a device 20, and the device can communicate with the control system 70. Other users (not shown) may have similar devices and communicate with the control system similarly. The application can be stored, all or in part, on a computer or a computer in a mobile device and at a control system communicating with the device, for example, using the communications network 45, such as the Internet. It is envisioned that the application can access all or part of program instructions to implement the method of the present disclosure. The program or application can communicate with a remote computer system via a communications network 45 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 70 is in communication with the device(s) 20, and the device 20 can include the application 40. The device 20 communicates with the control system 70 using the communications network 45.

In another example, the control system 70 can have a front-end computer belonging to one or more users, such as the device 20, and a back-end computer embodied as the control system.

Also, referring to FIG. 1, the device 20 can include a computer 22, computer readable storage medium 34, and operating systems, and/or programs, and/or a software application 40, which can include program instructions executable using a processor 15. These features are shown herein in FIG. 1, and also in an embodiment of a computer system shown in FIG. 8 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer for implementing the features of the method according to the present disclosure. In another example, a computer for implementing the features of the method can be part of a mobile device and thus implement the method locally.

Still Further Embodiments and Examples

It is understood that the features shown in the FIGS. are functional representations of features of the present disclosure. Such features are shown in embodiments of the systems and methods of the present disclosure for illustrative purposes to clarify the functionality of features of the present disclosure.

Specifically, regarding the control system 70, the device(s) 20 of one or more users 14 can be in communication with the control system 70 via the communications network 50. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 20 communicate with the control system 70 and the one or more programs 74 stored on a computer readable storage medium 73. The control system includes the computer 72 having a processor 75, which also has access to the database 76.

The control system 70 can include a storage medium 80 for maintaining a registration 82 of users and their devices for analysis of the audio input. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, the device 20, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of devices 20 having the application 40. The application 40 is stored on the devices 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a device 20. It is envisioned that the control system 70 can not only store the profile of users, but in one embodiment, can interact with a website for viewing on a display of a device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

In one example, Artificial Intelligence (AI) can be used, all or in part, for a learning model for analyzing a biometric change for a user and a personality profile results for the user to determine an action in response to the detected biometric change.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Figure 6:
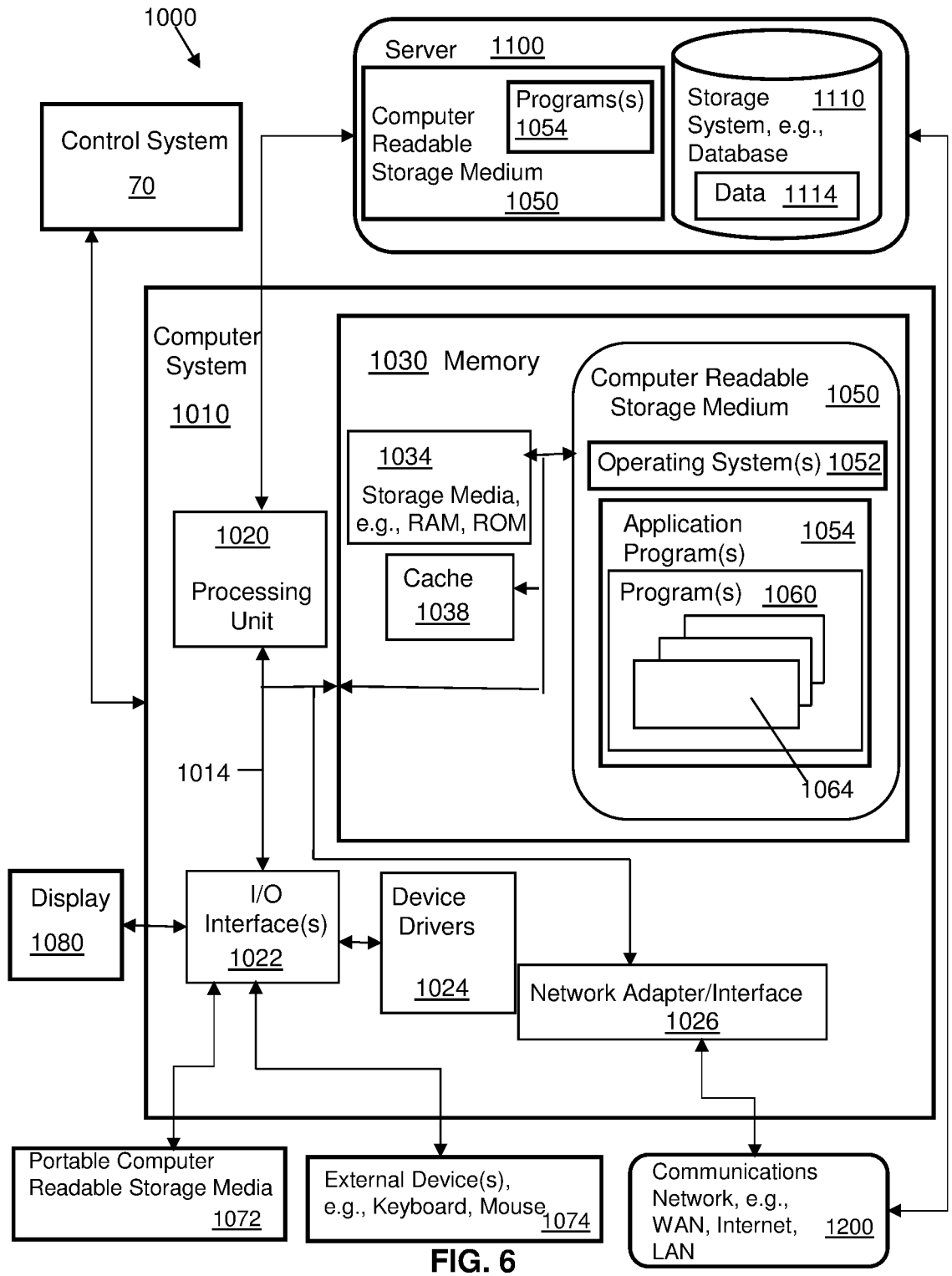
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 7:
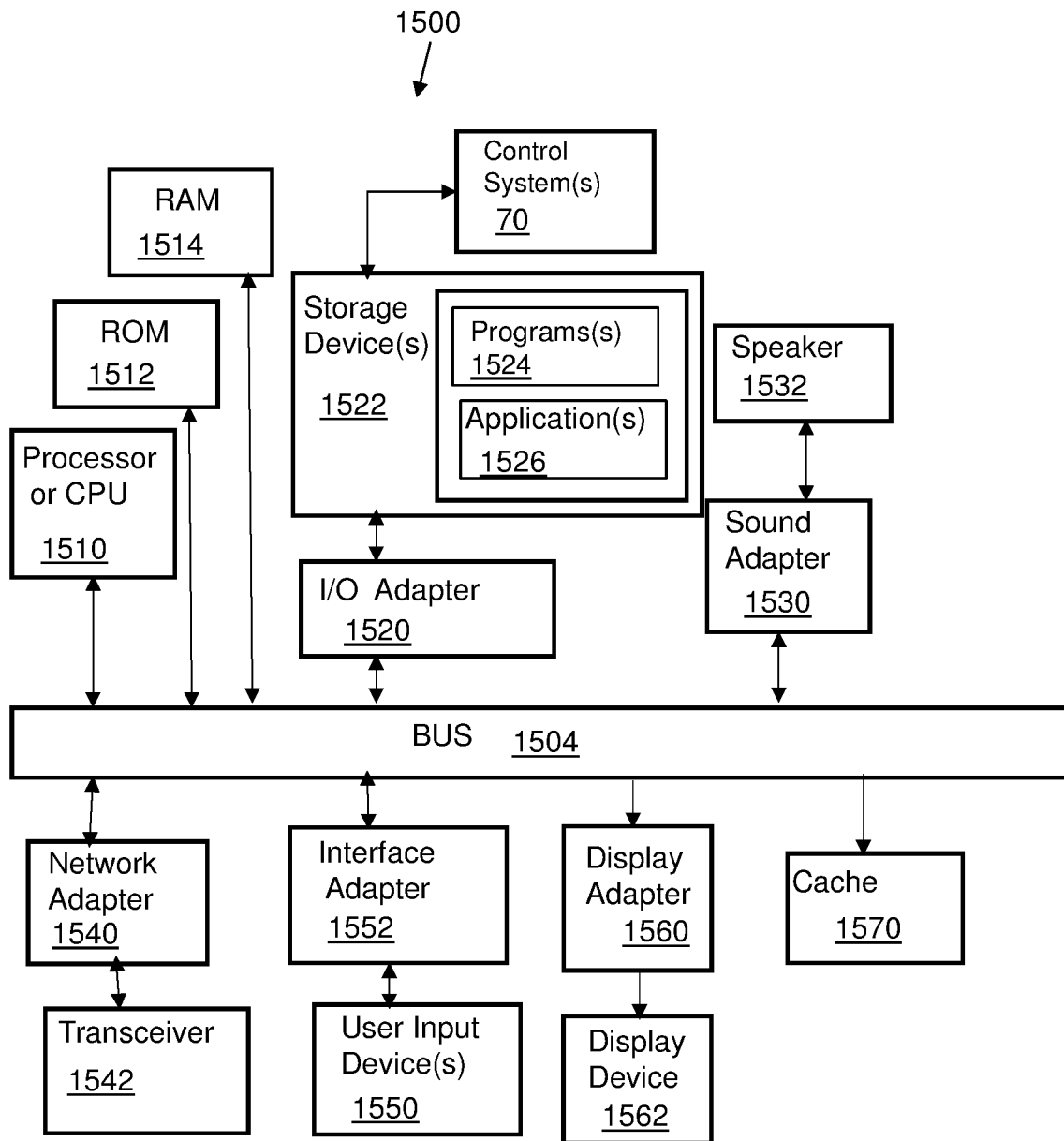
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Still More Embodiments and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
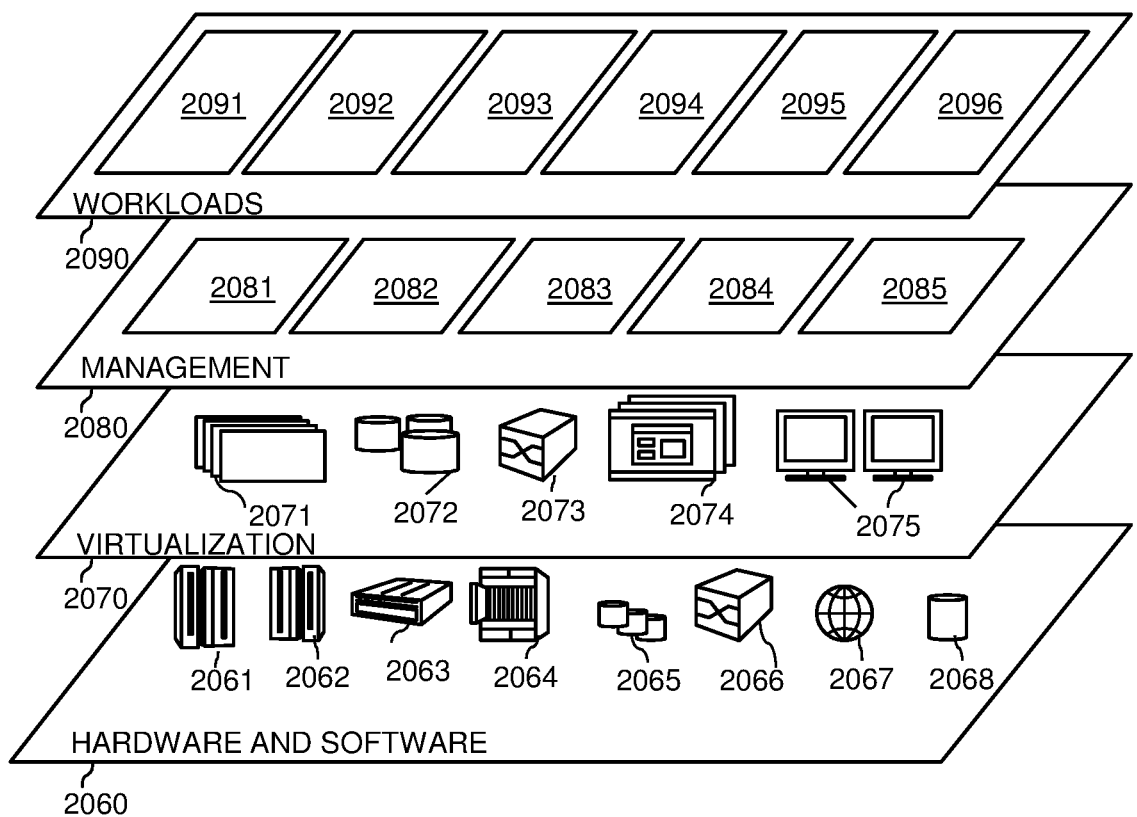
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and detecting and analyzing personalized data of a participant in an electronic group meeting or collaboration and sharing the personalized data with other participants 2096.

What is claimed is:

1. A computer-implemented method for assessing a state of a participant and sharing personalized data about the participant in an electronic group meeting or collaboration using a communications network, comprising:
receiving personalized data, at a computer, for a user participating in electronic group communications, the group communications including group collaboration by a plurality of users participating in the group communications and forming a group which includes the user, the group communications include communications via a communications network by the plurality of users in the group, the personalized data received at the computer including biometric data and personality profile results, the biometric data including biometric changes in real-time;
detecting a biometric change in the user from a baseline for the user;
analyzing, in response to the biometric change, the biometric data and the personality profile results to determine an action regarding the user wherein the action is communicative to one or more of the plurality of users;
implementing the action regarding the group communications for addressing the biometric change in the user;
identifying a communication in the group collaboration previous to the biometric change wherein the biometric change is probably in response to the communication;
identifying a topic or subject of the identified communication; and
using the topic or the subject of the identified communication as part of the analysis to determine the action.

2. The method of claim 1, wherein the personality profile results are received at the computer from an online personality profile test or by a manual upload from a user.

3. The method of claim 1, wherein the biometric data is received at the computer from one or more biometric measuring devices.

4. The method of claim 3, wherein the one or more biometric measuring devices include at least one IoT (Internet of Things) device.

5. The method of claim 1, wherein the action includes one or more communicable responses, and the communicable responses include addressing one or more of the participants.

6. The method of claim 1, wherein the action includes an alert and/or suggestion regarding the meeting and/or a health issue of the user, the alert and/or the suggestion being communicable to the user or another user.

7. The method of claim 1, wherein the action includes a suggested response for the user.

8. The method of claim 1, wherein the action includes a communication to one or more users of the group.

9. The method of claim 1, wherein the action includes a time parameter for a response for the user.

10. The method of claim 9, wherein the time parameter includes a time variable for communicating a message to one or more users of a group of participants.

11. The method of claim 1, further comprising:
identifying the biometric change for the user, as part of the analyzing of the biometric data;
identifying a communication in the group collaboration previous to the biometric change which probably initiated the biometric change in the user;
analyzing the personality profile of the user with respect to the biometric change; and
determining the action based on the personality profile with respect to the biometric change to best respond to the identified communication.

12. The method of claim 11, wherein the action includes a best response to resolve a problem or move the group collaboration forward to a solution.

13. The method of claim 1, further comprising:
receiving data for one or more users participating in the electronic group meeting;
detecting a biometric change for the one or more users, respectively, from a baseline for each of the users;
analyzing, in response to the biometric change for each of the one or more users, the biometric data and personality profiles for each of the one or more users; and
communicating one or more actions to one or more users of the group communications.

14. The method of claim 1, further comprising:
monitoring, using the computer, a plurality of users participating in the electronic group collaboration, the monitoring occurring with permission of the plurality of users, and the plurality of users using the communications network for communicating as a group.

15. The method of claim 14, further comprising:
detecting, from a plurality of IoT devices, for one or more of the plurality of users, respectively, a biometric change in a user from a baseline.

16. The method of claim 15, wherein the biometric change indicates a probability of an increased stress level of a user of the plurality of users.

17. The method of claim 16, further comprising:
corresponding the biometric change to a change or an initial appearance of a post or communication in the group communications.

18. The method of claim 17, communicating one or more user's possible stress level to the group in the group communication, based on the probability of the increased stress level of the user.

19. The method of claim 1, further comprising:
modifying a post or an attendee list of the group communications based on the biometric changes corresponding to the post in the group communications.

20. The method of claim 19, further comprising:
associating a user having the biometric change to a personality type using the personality profile for the user; and modifying the post or the attendee list based on the personality type of the user, and/or presenting a list of preferred responses, with respect to the personality type of the user, to the user or one or more of the plurality of users in the group.

21. The method of claim 1, further comprising:
monitoring, using the computer, biometrics of a plurality of users, respectively, the monitoring occurring with permission of the plurality of users, and the users using the communications network for communicating as a group;
detecting, from a plurality of IoT devices, a biometric change in a user from a baseline, wherein the biometric change indicates a probability of an increased stress level of the user;
corresponding the biometric change to an event or initial appearance of a post in the group communications;
associating a user having the biometric change to a personality type using the personality profile; and
modifying the post or an attendee list based on the analysis of the biometric data and the personality type for the user, and/or presenting one or more preferred responses based on the analysis to the user or to other users in the group in response to the event.

22. The method of claim 21, further comprising:
communicating one or more users' possible stress levels to the group in the group communication, based on the possible increased stress level of the user.

23. The method of claim 22, further comprising:
identifying the biometric change for the user, as part of the analyzing of the biometric data;
identifying a communication in the group collaboration previous to the biometric change having a probability of initiating the biometric change for the user;
analyzing the personality profile of the user with respect to the biometric change; and
determining an action based on the personality profile with respect to the biometric change to best respond to the identified communication.

24. The method of claim 23, wherein the action includes a best response to resolve a problem or move the group collaboration forward to a solution.

25. The method of claim 1, wherein the implemented action includes a communication to the user or another participant user of the group communications based on the analysis.

26. A system to assess a state of a participant and share personalized data about the participant in an electronic group meeting or collaboration using a communications network, which comprises:
a computer system comprising; a computer processor, a computer-readable storage medium, and program instructions stored on the computer-readable storage medium being executable by the processor, to cause the computer system to perform the following functions to;
receive personalized data, at a computer, for a user participating in electronic group communications, the group communications including group collaboration by a plurality of users participating in the group communications and forming a group which includes the user, the group communications include communications via a communications network by the plurality of users in the group, the personalized data received at the computer including biometric data and personality profile results, the biometric data including biometric changes in real-time;
detect a biometric change in the user from a baseline for the user;
analyze, in response to the biometric change, the biometric data and the personality profile results to determine an action regarding the user wherein the action is communicative to one or more of the plurality of users;
implement the action regarding the group communications for addressing the biometric change in the user;
identifying a communication in the group collaboration previous to the biometric change wherein the biometric change is probably in response to the communication;
identifying a topic or subject of the identified communication; and
using the topic or the subject of the identified communication as part of the analysis to determine the action.

27. A computer program product to assess a state of a participant and sharing personalized data about the participant in an electronic group meeting or collaboration using a communications network, the computer program product comprising a computer readable storage medium having program instructions embodied therewith, the program instructions executable by a computer to cause the computer to perform functions, by the computer, comprising the functions to:
receive personalized data, at a computer, for a user participating in electronic group communications, the group communications including group collaboration by a plurality of users participating in the group communications and forming a group which includes the user, the group communications include communications via a communications network by the plurality of users in the group, the personalized data received at the computer including biometric data and personality profile results, the biometric data including biometric changes in real-time;
detect a biometric change in the user from a baseline for the user;
analyze, in response to the biometric change, the biometric data and the personality profile results to determine an action regarding the user wherein the action is communicative to one or more of the plurality of users;
implement the action regarding the group communications for addressing the biometric change in the user;
identifying a communication in the group collaboration previous to the biometric change wherein the biometric change is probably in response to the communication;
identifying a topic or subject of the identified communication; and
using the topic or the subject of the identified communication as part of the analysis to determine the action.

28. The method of claim 1, wherein the personality profile results are generated from a personality test and received at the computer as part of the received data for use in the analysis.

29. A computer-implemented method for assessing a state of a participant and sharing personalized data about the participant in an electronic group meeting or collaboration using a communications network, comprising:
receiving personalized data, at a computer, for a user participating in electronic group communications, the group communications including group collaboration by a plurality of users participating in the group communications and forming a group which includes the user, the group communications include communications via a communications network by the plurality of users in the group, the personalized data received at the computer including biometric data and personality profile results, the biometric data including biometric changes in real-time;

detecting a biometric change in the user from a baseline for the user;

analyzing, in response to the biometric change, the biometric data and the personality profile results to determine an action regarding the user wherein the action is communicative to one or more of the plurality of users;

implementing the action regarding the group communications for addressing the biometric change in the user;

identifying the biometric change for the user, as part of the analyzing of the biometric data;

identifying a communication in the group collaboration previous to the biometric change which probably initiated the biometric change in the user;

analyzing the personality profile of the user with respect to the biometric change; and determining the action based on the personality profile with respect to the biometric change to best respond to the identified communication.

30. A computer-implemented method for assessing a state of a participant and sharing personalized data about the participant in an electronic group meeting or collaboration using a communications network, comprising:

receiving personalized data, at a computer, for a user participating in electronic group communications, the group communications including group collaboration by a plurality of users participating in the group communications and forming a group which includes the user, the group communications include communications via a communications network by the plurality of users in the group, the personalized data received at the computer including biometric data and personality profile results, the biometric data including biometric changes in real-time;

detecting a biometric change in the user from a baseline for the user;

analyzing, in response to the biometric change, the biometric data and the personality profile results to determine an action regarding the user wherein the action is communicative to one or more of the plurality of users;

implementing the action regarding the group communications for addressing the biometric change in the user;

monitoring, using the computer, biometrics of a plurality of users, respectively, the monitoring occurring with permission of the plurality of users, and the users using the communications network for communicating as a group;

detecting, from a plurality of IoT devices, a biometric change in a user from a baseline, wherein the biometric change indicates a probability of an increased stress level of the user;

corresponding the biometric change to an event or initial appearance of a post in the group communications;

associating a user having the biometric change to a personality type using the personality profile;

modifying the post or an attendee list based on the analysis of the biometric data and the personality type for the user, and/or presenting one or more preferred responses based on the analysis to the user or to other users in the group in response to the event;

communicating one or more users' possible stress levels to the group in the group communication, based on the possible increased stress level of the user;

identifying the biometric change for the user, as part of the analyzing of the biometric data;

identifying a communication in the group collaboration previous to the biometric change having a probability of initiating the biometric change for the user;

analyzing the personality profile of the user with respect to the biometric change; and determining an action based on the personality profile with respect to the biometric change to best respond to the identified communication.

* * * * *